United States Patent
Wang et al.

(10) Patent No.: US 12,287,128 B2
(45) Date of Patent: Apr. 29, 2025

(54) SIPHON EVAPORATION DEVICE HAVING HEAT EXCHANGE STRUCTURE, AND OPERATION METHOD AND APPLICATION THEREOF

(71) Applicant: ANHUI METAENERGY TECHNOLOGIES CO. LTD., Anhui (CN)

(72) Inventors: Desheng Wang, Hefei (CN); Linghui Zhu, Hefei (CN)

(73) Assignee: ANHUI METAENERGY TECHNOLOGIES CO.LTD., Anhui (CN)

( * ) Notice: Subject to any disclaimer, the term of this patent is extended or adjusted under 35 U.S.C. 154(b) by 0 days.

(21) Appl. No.: 18/566,645

(22) PCT Filed: Mar. 29, 2022

(86) PCT No.: PCT/CN2022/083533
§ 371 (c)(1),
(2) Date: Dec. 2, 2023

(87) PCT Pub. No.: WO2023/065600
PCT Pub. Date: Apr. 27, 2023

(65) Prior Publication Data
US 2024/0310084 A1    Sep. 19, 2024

(30) Foreign Application Priority Data
Oct. 19, 2021  (CN) .......................... 202111213644.5

(51) Int. Cl.
*F25B 15/00* (2006.01)

(52) U.S. Cl.
CPC ................................. *F25B 15/008* (2013.01)

(58) Field of Classification Search
CPC ........ F25B 15/008; F25B 37/00; F25B 39/02; Y02B 30/62
See application file for complete search history.

(56) References Cited

U.S. PATENT DOCUMENTS

| | | | |
|---|---|---|---|
| 10,156,385 B1* | 12/2018 | Kapsha | F25B 49/02 |
| 2005/0284169 A1* | 12/2005 | Tamura | F25B 41/00 |
| | | | 62/DIG. 22 |
| 2016/0054073 A1* | 2/2016 | Rice | F28D 15/043 |
| | | | 165/104.24 |

* cited by examiner

*Primary Examiner* — Lionel Nouketcha
(74) *Attorney, Agent, or Firm* — Bochner PLLC; Andrew Bochner; Eric Kleinertz

(57) ABSTRACT

Provided are a siphon evaporation device having a heat exchange structure, and an operation method and application thereof. The siphon evaporation device includes an evaporator and a heat exchanger. The heat exchanger is located above the evaporator. A liquid refrigerant outlet at the lower end of the heat exchanger is connected to a liquid refrigerant inlet at the upper end of the evaporator. A gaseous refrigerant outlet at the upper end of the evaporator is connected to a gaseous refrigerant inlet at the lower end of the heat exchanger. A liquid refrigerant passes through a heat exchange tube pass of the heat exchanger. A tail end of the heat exchange tube pass is connected to a shell pass of the heat exchanger at the bottom of the heat exchanger through a pressure reduction pipe. The gaseous refrigerant outlet is further formed on the heat exchanger.

18 Claims, 3 Drawing Sheets

SIPHON EVAPORATION DEVICE HAVING HEAT EXCHANGE STRUCTURE, AND OPERATION METHOD AND APPLICATION THEREOF

CROSS-REFERENCE TO RELATED APPLICATION

This application is a national stage application of International Patent Application No. PCT/CN2022/083533, filed on Mar. 29, 2022, which claims the priority of Chinese Patent Application No. 202111213644.5 filed with the China National Intellectual Property Administration on October 19. 2011 and entitled "SIPHON EVAPORATION DEVICE HAVING HEAT EXCHANGE STRUCTURE, AND OPERATION METHOD AND APPLICATION THEREOF", the disclosure of which is incorporated by reference herein in its entirety as part of the present application.

TECHNICAL FIELD

The present disclosure relates to the technical field of adsorption refrigeration, in particular to a siphon evaporation device having a heat exchange structure, and an operation method and application thereof.

BACKGROUND

In the refrigeration system, the evaporator is an indispensable key device. At present, in the industrial refrigeration system, refrigerant liquid supply methods commonly used include supplying liquid by direct expansion, gravity, liquid pump, air pump and the like. The siphon evaporator with liquid supply by the gravity is high in heat transfer efficiency and suitable for high-viscosity fluids, so siphon evaporator is more and more widely used in the refrigeration system. The principle of the siphon evaporator is that the density difference (potential energy difference) is produced by the different states of the refrigerant at the refrigerant inlet and outlet, and the refrigerant is driven to carry out circulating heat exchange by using pressure difference as power. When the potential energy difference is increased, the circulation volume of the refrigerant in the siphon evaporator can reach several times of evaporation amount, the circulating ratio is increased, and the heat transfer coefficient is also increased. The siphon evaporator is the best choice for media with high dynamic viscosity, chilled water or other fluids cooled in batches.

However, when the subcooling degree of the refrigerant at the inlet of the gas-liquid separator of the siphon evaporator is insufficient, the loss of cooling capacity is large. The refrigerant at the outlet of the evaporator is a gas-liquid mixture. After being separated by the gas-liquid separator, saturated refrigerant vapor leaves the siphon evaporator, but the low-temperature vapor still contains partial cooling capacity, Waste of the cooling capacity may be caused if the saturated refrigerant vapor directly leaves the siphon evaporator, and the efficiency of the refrigeration system is reduced. Moreover, there is an enough gas-liquid separation space in the top space of the gas-liquid separator. The gas-liquid separator is low in liquid level and large in volume, resulting in huge space waste. As shown in FIG. 3, in the existing absorption refrigeration system with ammonia water, a precooler is usually provided to exchange heat between low-temperature gas ammonia and normal-temperature liquid ammonia so as to increase the refrigeration efficiency of the system. However, the system investment is increased, the process is complicated, and the system resistance is increased, if the number of the devices is increased.

SUMMARY

Based on this, the purpose of the present disclosure is to provide a siphon evaporation device having a heat exchange structure, and an operation method and application thereof. The siphon evaporation device is simple in structure and reasonable in design.

In order to achieve the purpose, the present disclosure provides a siphon evaporation device having a heat exchange structure. The siphon evaporation device includes an evaporator and a heat exchanger, where the heat exchanger is located above the evaporator, a liquid refrigerant outlet at a lower end of the heat exchanger is connected to a liquid refrigerant inlet at an upper end of the evaporator, a gaseous refrigerant outlet at the upper end of the evaporator is connected to a gaseous refrigerant inlet at the lower end of the heat exchanger, a liquid refrigerant passes through a heat exchange tube pass of the heat exchanger, a tail end of the heat exchange tube pass is connected to a shell pass of the heat exchanger at a bottom of the heat exchanger through a pressure reduction pipe, and a gaseous refrigerant outlet is further formed on the heat exchanger.

Preferably, the heat exchange tubes are located in an upper half of the heat exchanger, a liquid-phase space is arranged below the heat exchange tubes, and a liquid level meter is arranged on the heat exchanger.

Preferably, baffle plates are arranged in the heat exchanger for changing a flow direction of a gas phase and supporting the heat exchange tubes.

Preferably, the heat exchanger is a shell-and-tube heat exchanger or a spiral coil heat exchanger.

Preferably, at least two sets of support saddles are arranged between the evaporator and the heat exchanger, upper halves of the support saddles are fixed at a lower end of a barrel of the heat exchanger, lower halves of the support saddles are fixed at an upper end of a barrel of the evaporator, and the upper halves and the lower halves of the support saddles are installed by bolts.

The present disclosure also provides an operation method of a siphon evaporator. The siphon evaporator is the siphon evaporation device having a heat exchange structure. The operation method includes the following specific steps: making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression; making the low-temperature refrigerant enter the evaporator and evaporate into gas-liquid mixed vapor to enter the shell pass of the heat exchanger through the gaseous refrigerant inlet; where, in the heat exchanger, liquid of the gas-liquid mixed vapor falls by gravity after being baffled by baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the evaporator through the gaseous refrigerant outlet thereof; such that a cycle of operation is realized.

The present disclosure also provides an absorption refrigeration system. The absorption refrigeration system includes a generator, a condenser, a fluid reservoir and an absorber, and including the siphon evaporation device having a heat exchange structure according to any one of claims 1 to 5, where a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

Preferably, a gaseous refrigerant outlet of the generator is connected to a gaseous refrigerant inlet of the condenser, a liquid refrigerant outlet of the condenser is connected to the liquid refrigerant inlet of the fluid reservoir, a lean liquid inlet of the absorber is connected to a lean liquid outlet of the generator, and a rich liquid outlet of the absorber is connected to a rich liquid inlet of the generator.

Preferably, the lean liquid inlet of the absorber is connected to the lean liquid outlet of the generator through a GAX heat exchanger, and the rich liquid outlet of the absorber is connected to the rich liquid inlet of the generator through the GAX heat exchanger.

Preferably, the lean liquid inlet of the absorber is connected to the lean liquid outlet of the generator through a circulating water heat exchanger and the GAX heat exchanger in sequence, and circulating water inflow of the absorber enters the absorber after heat exchange by the circulating water heat exchanger.

According to the specific embodiments provided by the present disclosure, the present disclosure has the following technical effects.

According to a siphon evaporation device having a heat exchange structure provided by some embodiments, the heat exchanger is used for replacing an original gas-liquid separator, a supercooling degree of the refrigerant before entering the evaporator can be increased, the superheat degree of refrigerant vapor at the refrigerant outlet is improved, the refrigerating capacity of the refrigerating system is improved, and the COP (coefficient of performance) of the refrigerating system is increased by 2-3%. In the absorption refrigeration system, a precooler is reduced, and the process complexity is reduced. The integration of the device is improved, the number of devices is reduced, and the cost of the device is reduced. The installation of the precooler is reduced, so that the length of pipelines and the number of valves can be reduced, the cold loss of the system is reduced, the resistance loss of the system is reduced, and the system efficiency is improved.

BRIEF DESCRIPTION OF THE DRAWINGS

In order to illustrate the embodiments of the present disclosure or the technical solutions in the prior art more clearly, the drawings needed in the embodiments will be briefly introduced hereinafter. Apparently, the drawings in the following description are only some embodiments of the present disclosure. For those skilled in the art, other drawings can be obtained according to these drawings without paying creative labor.

Figure 1:
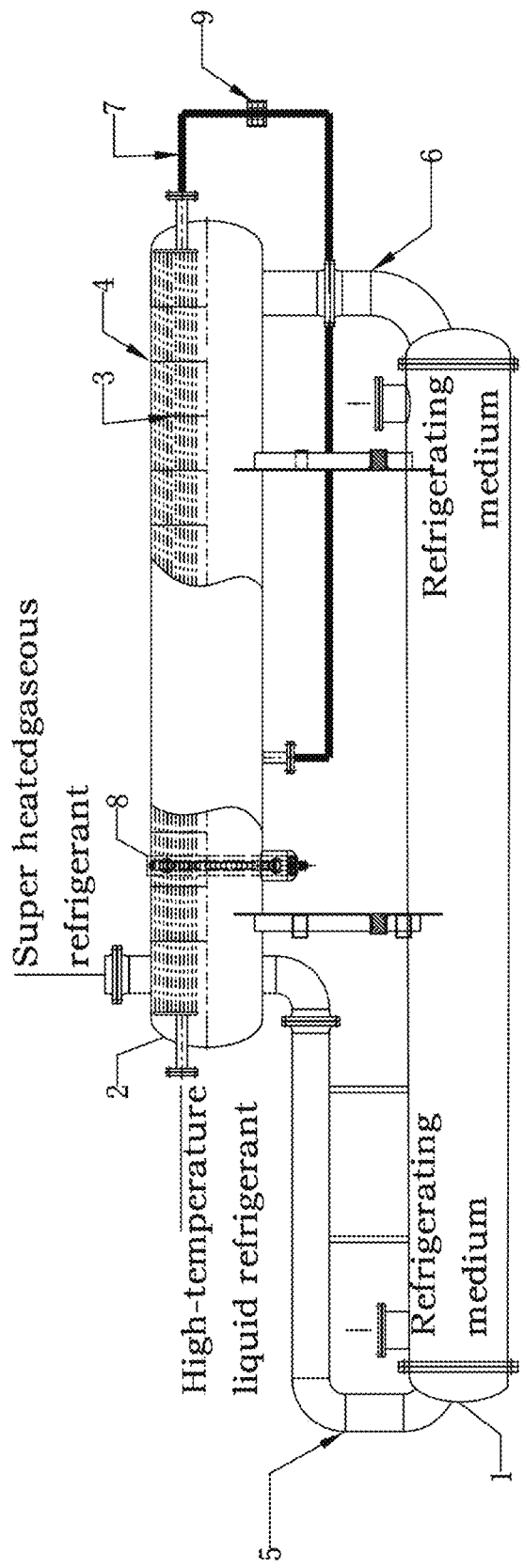
FIG. 1 is a front structural schematic diagram of a siphon evaporation device having a heat exchange structure according to the present disclosure.

List of reference numerals: 1 evaporator; 2 heat exchanger; 3 heat exchange tube; 4 baffle plate; 5 downspout; 6 standpipe; 7 connecting pipe; 8 liquid level meter; and 9 pressure reducing valve.

DETAILED DESCRIPTION OF THE EMBODIMENTS

The technical solutions in the embodiments of the present disclosure will be described clearly and completely hereinafter with reference to the drawings of the embodiments of the present disclosure. Apparently, the described embodiments are some embodiments of the present disclosure, rather than all of the embodiments. Based on the embodiments of the present disclosure. all other embodiments obtained by those skilled in the art without paying creative labor fall in the scope of protection of the present disclosure.

In order to make the above objects, features and advantages of the present disclosure more obvious and understandable, the present disclosure will be further explained in detail hereinafter with reference to the drawings and specific embodiments.

As shown in FIG. 1, a siphon evaporation device having a heat exchange structure in the embodiment includes an evaporator 1 and a heat exchanger 2. The heat exchanger 2 is located above the evaporator 1. A liquid refrigerant outlet at the lower end of the heat exchanger 2 is connected to a liquid refrigerant inlet at the upper end of the evaporator 1 through a downspout 5. A gaseous refrigerant outlet at the upper end of the evaporator I is connected to a gaseous refrigerant inlet at the lower end of the heat exchanger 2 through a standpipe 6. A liquid refrigerant inlet of the heat exchanger 2 is connected to a fluid reservoir. A liquid refrigerant passes through a heat exchange tube 3 pass of the heat exchanger 2. A connecting pipe 7 is arranged between a tail end of the heat exchange tube 3 pass and a shell pass of the heat exchanger 2. A pressure reducing valve 9 is arranged on the connecting pipe 7. The tail end of the heat exchange tube 3 pass is connected to the shell pass of the heat exchanger 2 at the bottom of the heat exchanger 2 through the pressure reducing valve 9. The secondary refrigerant outlet and the secondary refrigerant inlet are further formed on the heat exchanger 1. The gaseous refrigerant outlet is further formed on the heat exchanger 2. A liquid level meter 8 is arranged on the heat exchanger 2 for monitoring the liquid level of a bottom area of the heat exchanger 2.

The heat exchanger 2 can be a fixed tube sheet heat exchanger 2 provided with partial tubes, and the tubes are arranged in the gas phase at the top according to the designed operating liquid level. Baffle plates 4 are arranged in a barrel to change the flow direction of the gas phase, so that liquid droplets can be separated from the gas phase, and the baffle plates 4 also play a role in supporting the heat exchange tubes 3.

The heat exchanger 2 can also be used as a heat exchanger 2 without a tube sheet, and the heat exchange tubes 3 in the middle can be a straight tube or a spiral coil tube. The tubes are arranged in the gas phase at the top according to the designed operating liquid level. The baffle plates 4 are arranged in the barrel to change the flow direction of the gas phase, so that liquid droplets can be separated from the gas phase, and the baffle plates 4 also play a role in supporting the heat exchange tubes 3.

At least two support saddles are also arranged between the evaporator 1 and the heat exchanger 2. The upper half of the support saddle is fixed at the lower end of the barrel of the heat exchanger 2, the lower half of the support saddle is fixed at the upper end of the barrel of the evaporator 1, and the upper half and the lower half of the support saddle are installed by bolts, so that the whole device is convenient to be assembled.

An operation method of the siphon evaporation device having a heat exchange structure according to the embodiment includes the following specific steps: a high-temperature liquid refrigerant enters a tube pass of a heat exchanger 2 at the top from a fluid reservoir to change into a low-temperature supercooled refrigerant after heat exchange by a gaseous refrigerant outside the tube, and then the low-temperature supercooled refrigerant enters a shell pass of the heat exchanger 2 after decompression; the low-temperature refrigerant enters the evaporator 1 and evaporates into gas-liquid mixed vapor to enter the shell pass of the heat exchanger 2 through a gaseous refrigerant inlet. In the heat exchanger 2, liquid of the gas-liquid mixed vapor falls by gravity after being baffled by baffle plates 4 and heat exchange tubes 3, the gas refrigerant exchanges heat with the high-temperature liquid refrigerant that has just entered the tube pass of the heat exchanger 2, and the gaseous refrigerant changes into superheated gaseous refrigerant and leaves the heat exchanger 2 through a gaseous refrigerant outlet; and thus a cycle of operation is realized.

Figure 2:
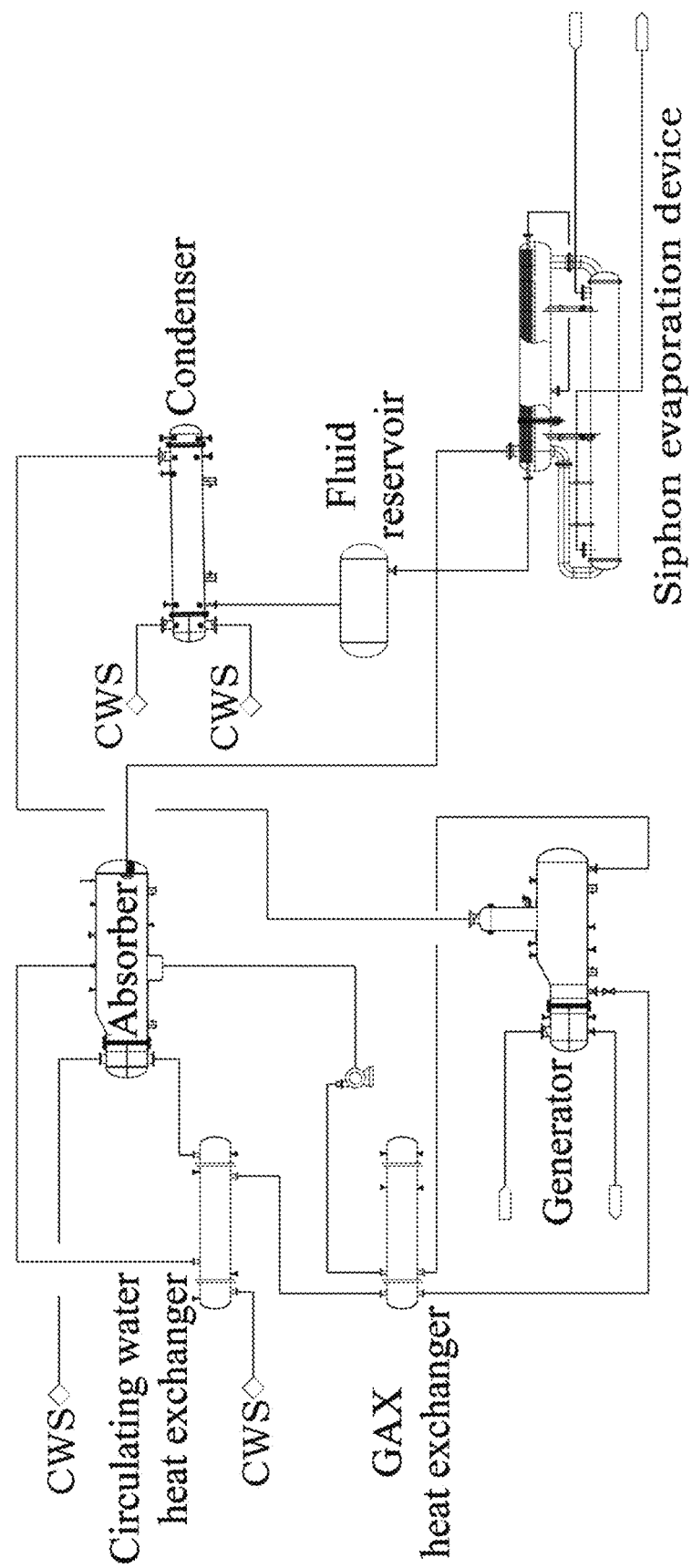
FIG. 2 is a process diagram of an absorption refrigeration system of a siphon evaporation device having a heat exchange structure according to the present disclosure.
Figure 3:
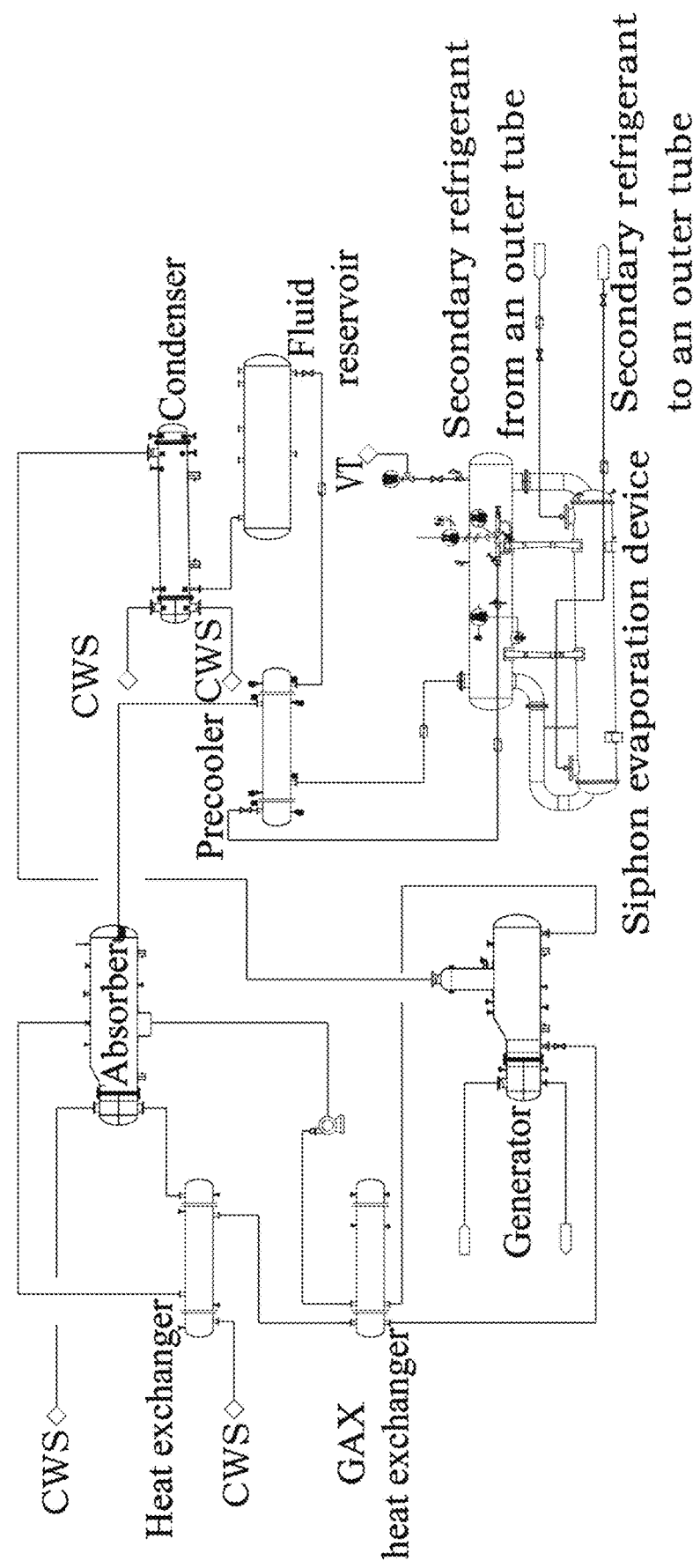
FIG. 3 is a process diagram of an absorption refrigeration system in the prior art.

As shown in FIG. 2, an absorption refrigeration system according to the embodiment includes a generator, a condenser, a fluid reservoir and an absorber, and also includes the siphon evaporation device having a heat exchange structure mentioned above. A liquid refrigerant inlet of the heat exchanger is connected to a liquid refrigerant outlet of the fluid reservoir. A gaseous refrigerant outlet of the heat exchanger is connected to a gaseous refrigerant inlet of the absorber. A gaseous refrigerant outlet of the generator is connected to a gaseous refrigerant inlet of the condenser. A liquid refrigerant outlet of the condenser is connected to a liquid refrigerant inlet of the fluid reservoir. A lean liquid inlet of the absorber is connected to a lean liquid outlet of the generator through a circulating water heat exchanger and a GAX (generator-absorber heat exchange) heat exchanger in sequence. Circulating water inflow in the absorber enters the absorber after heat exchange by the circulating water heat exchanger. A rich liquid outlet of the absorber is connected to a rich liquid inlet of the generator through a GAX heat exchanger. First, in the GAX heat exchanger, high-temperature lean liquid exchanges heat with rich liquid discharged from the absorber, and then in the circulating water heat exchanger, the circulating water entering the absorber further exchanges heat with the lean liquid.

A high-temperature liquid refrigerant enters the tube pass of the heat exchanger 2 at the top from the fluid reservoir to change into a low-temperature supercooled refrigerant after heat exchange by the gas refrigerant outside the tube, and then the low-temperature supercooled refrigerant enters a shell pass of the heat exchanger 2 after decompression. The low-temperature refrigerant enters the evaporator 1 and evaporates into gas-liquid mixed vapor to enter the shell pass of the heat exchanger 2 through a gaseous refrigerant inlet. In the heat exchanger 2, liquid of the gas-liquid mixed vapor falls by gravity after being baffled by baffle plates 4 and heat exchange tubes 3. The gas refrigerant exchanges heat with the high-temperature liquid refrigerant that has just entered the tube pass of the heat exchanger 2, and the gaseous refrigerant changes into superheated gaseous refrigerant and leaves the heat exchanger 2 through a gaseous refrigerant outlet to enter the absorber. In the process, a precooler is reduced, and the process complexity is reduced. The heat exchanger 2 is used for replacing an original gas-liquid separator, a supercooling degree of the refrigerant before entering the evaporator 1 can be increased, the superheat degree of refrigerant vapor at the refrigerant outlet is improved, the refrigerating capacity of the refrigerating system is improved, and the COP (Coefficient Of Performance) of the refrigerating system is increased by 2-3%.

All embodiments in this specification are described in a progressive manner. Each embodiment focuses on differences from other embodiments. For the part that is the same or similar between different embodiments, reference may be made between the embodiments.

In this specification, specific embodiments aim to illustrate the principle and implementation of the present disclosure. The explanation of the above embodiments is only used to help understand the method and its core idea of the present disclosure. According to the idea of the present disclosure, there will be some changes in the specific implementation and application scope for those skilled in the art. To sum up, the contents of this specification should not be construed as limiting the present disclosure.

What is claimed is:

1. A siphon evaporation device having a heat exchange structure, comprising an evaporator and a heat exchanger, wherein the heat exchanger is located above the evaporator, a liquid refrigerant outlet at a lower end of the heat exchanger is connected to a liquid refrigerant inlet at an upper end of the evaporator, a gaseous refrigerant outlet at the upper end of the evaporator is connected to a gaseous refrigerant inlet at the lower end of the heat exchanger, a liquid refrigerant passes through a heat exchange tube pass of the heat exchanger, a tail end of the heat exchange tube pass is connected to a shell pass of the heat exchanger at a bottom of the heat exchanger through a pressure reduction pipe, and a gaseous refrigerant outlet is further formed on the heat exchanger.

2. The siphon evaporation device having a heat exchange structure according to claim 1, wherein the heat exchange tubes are located in an upper half of the heat exchanger, a liquid-phase space is arranged below the heat exchange tubes, and a liquid level meter is arranged on the heat exchanger.

3. An operation method of a siphon evaporator, wherein the siphon evaporator is the siphon evaporation device having a heat exchange structure according to claim 2, and the operation method includes the following specific steps:
    making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression;
    making the low-temperature refrigerant enter the evaporator and evaporate into gas-liquid mixed vapor to enter the shell pass of the heat exchanger through the gaseous refrigerant inlet;
    wherein, in the heat exchanger, liquid of the gas-liquid mixed vapor falls by gravity after being baffled by baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the evaporator through the gaseous refrigerant outlet thereof; such that a cycle of operation is realized.

4. An absorption refrigeration system, comprising a generator, a condenser, a fluid reservoir and an absorber, and comprising the siphon evaporation device having a heat exchange structure according to claim 2, wherein a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

5. The siphon evaporation device having a heat exchange structure according to claim 1, wherein baffle plates are arranged in the heat exchanger for changing a flow direction of a gas phase and supporting the heat exchange tubes.

6. An operation method of a siphon evaporator, wherein the siphon evaporator is the siphon evaporation device having a heat exchange structure according to claim 5, and the operation method includes the following specific steps:
   making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression;
   making the low-temperature refrigerant enter the evaporator and evaporate into gas-liquid mixed vapor to enter the shell pass of the heat exchanger through the gaseous refrigerant inlet;
   wherein, in the heat exchanger, liquid of the gas-liquid mixed vapor falls by gravity after being baffled by the baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the evaporator through the gaseous refrigerant outlet thereof; such that a cycle of operation is realized.

7. An absorption refrigeration system, comprising a generator, a condenser, a fluid reservoir and an absorber, and comprising the siphon evaporation device having a heat exchange structure according to claim 3, wherein a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

8. The siphon evaporation device having a heat exchange structure according to claim 1, wherein the heat exchanger is a shell-and-tube heat exchanger or a spiral coil heat exchanger.

9. An operation method of a siphon evaporator, wherein the siphon evaporator is the siphon evaporation device having a heat exchange structure according to claim 8, and the operation method includes the following specific steps:
   making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression;
   making the low-temperature refrigerant enter the evaporator and evaporate into gas-liquid mixed vapor to enter the shell pass of the heat exchanger through the gaseous refrigerant inlet;
   wherein, in the heat exchanger, liquid of the gas-liquid mixed vapor falls by gravity after being baffled by baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the evaporator through the gaseous refrigerant outlet thereof; such that a cycle of operation is realized.

10. An absorption refrigeration system, comprising a generator, a condenser, a fluid reservoir and an absorber, and comprising the siphon evaporation device having a heat exchange structure according to claim 8, wherein a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

11. The siphon evaporation device having a heat exchange structure according to claim 1, wherein at least two sets of support saddles are arranged between the evaporator and the heat exchanger, upper halves of the support saddles are fixed at a lower end of a barrel of the heat exchanger, lower halves of the support saddles are fixed at an upper end of a barrel of the evaporator, and the upper halves and the lower halves of the support saddles are installed by bolts.

12. An operation method of a siphon evaporator, wherein the siphon evaporator is the siphon evaporation device having a heat exchange structure according to claim 11, and the operation method includes the following specific steps:
   making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression;
   making the low-temperature refrigerant enter the evaporator and evaporate into gas-liquid mixed vapor to enter the shell pass of the heat exchanger through the gaseous refrigerant inlet;
   wherein, in the heat exchanger, liquid of the gas-liquid mixed vapor falls by gravity after being baffled by baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the evaporator through the gaseous refrigerant outlet thereof; such that a cycle of operation is realized.

13. An absorption refrigeration system, comprising a generator, a condenser, a fluid reservoir and an absorber, and comprising the siphon evaporation device having a heat exchange structure according to claim 11, wherein a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

14. An operation method of a siphon evaporator, wherein the siphon evaporator is the siphon evaporation device having a heat exchange structure according to claims 1, and the operation method includes the following specific steps:
   making a high-temperature liquid refrigerant enter the tube pass of the heat exchanger at a top of the heat exchanger from a fluid reservoir to change into a low-temperature supercooled refrigerant after heat exchange by a gaseous refrigerant outside the heat exchange tubes, and then making the low-temperature supercooled refrigerant enter the shell pass of the heat exchanger after decompression;

making the low-temperature refrigerant enter the evaporator and evaporate into gas-liquid mixed vapor to enter the shell pass of the heat exchanger through the gaseous refrigerant inlet;

wherein, in the heat exchanger, liquid of the gas-liquid mixed vapor falls by gravity after being baffled by baffle plates and the heat exchange tubes, the gaseous refrigerant exchanges heat with the high-temperature liquid refrigerant that has just entered the tube pass of the heat exchanger, and the gaseous refrigerant changes into superheated gaseous refrigerant and leaves the heat exchanger through the gaseous refrigerant outlet thereof; such that a cycle of operation is realized.

15. An absorption refrigeration system, comprising a generator, a condenser, a fluid reservoir and an absorber, and comprising the siphon evaporation device having a heat exchange structure according to claims 1, wherein a liquid refrigerant inlet of the heat exchanger is connected to a liquid refrigerant outlet of the fluid reservoir, and the gaseous refrigerant outlet of the heat exchanger is connected to a gaseous refrigerant inlet of the absorber.

16. The absorption refrigeration system according to claim 15, wherein a gaseous refrigerant outlet of the generator is connected to a gaseous refrigerant inlet of the condenser, a liquid refrigerant outlet of the condenser is connected to the liquid refrigerant inlet of the fluid reservoir, a lean liquid inlet of the absorber is connected to a lean liquid outlet of the generator, and a rich liquid outlet of the absorber is connected to a rich liquid inlet of the generator.

17. The absorption refrigeration system according to claim 16, wherein the lean liquid inlet of the absorber is connected to the lean liquid outlet of the generator through a GAX heat exchanger, and the rich liquid outlet of the absorber is connected to the rich liquid inlet of the generator through the GAX heat exchanger.

18. The absorption refrigeration system according to claim 17, wherein the lean liquid inlet of the absorber is connected to the lean liquid outlet of the generator through a circulating water heat exchanger and the GAX heat exchanger in sequence, and circulating water inflow of the absorber enters the absorber after heat exchange by the circulating water heat exchanger.

* * * * *